United States Patent
Matsui

(10) Patent No.: US 8,757,660 B2
(45) Date of Patent: Jun. 24, 2014

(54) PASSENGER AIRBAG DEVICE

(75) Inventor: Yoshitaka Matsui, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/357,944

(22) Filed: Jan. 25, 2012

(65) Prior Publication Data

US 2012/0193895 A1 Aug. 2, 2012

(30) Foreign Application Priority Data

Jan. 27, 2011 (JP) .................................. 2011-015092

(51) Int. Cl.
  *B60R 21/261* (2011.01)
  *B60R 21/217* (2011.01)
  *B60R 21/205* (2011.01)

(52) U.S. Cl.
  CPC ............. *B60R 21/205* (2013.01); *B60R 21/217* (2013.01); *B60R 21/261* (2013.01)
  USPC ............................ 280/740; 280/742; 280/732

(58) Field of Classification Search
  CPC .. B60R 21/217; B60R 21/261; B60R 21/205; B60R 21/26
  USPC ........... 280/742, 740, 732, 728.2, 728.1, 736, 280/730.1
  See application file for complete search history.

(56) References Cited

U.S. PATENT DOCUMENTS

| 7,722,075 | B2 | 5/2010 | Amamori | |
| 2002/0149177 | A1* | 10/2002 | Rose et al. | 280/728.2 |
| 2005/0110247 | A1* | 5/2005 | Suzuki et al. | 280/728.3 |

FOREIGN PATENT DOCUMENTS

| JP | 2004-001635 | A | | 1/2004 | |
| JP | 2006-151128 | | * | 6/2006 | ............ B60R 21/20 |
| JP | 2006-151128 | A | | 6/2006 | |
| JP | 2006151128 | A | * | 6/2006 | |
| JP | 2007-210519 | | * | 8/2007 | ............ B60R 21/20 |
| JP | 2007210519 | A | * | 8/2007 | |
| JP | 2009-143336 | A | | 7/2009 | |

* cited by examiner

*Primary Examiner* — Keith Frisby

(74) *Attorney, Agent, or Firm* — Fitch, Even, Tabin & Flannery, LLP

(57) ABSTRACT

In one form, a passenger airbag device is provided including an airbag; a retainer having an opening on a passenger side; a bag ring provided to an inside of the retainer; and the gas generating device; wherein: the retainer further includes a base wall that forms a substantially rectangular outer edge shape; two first peripheral wall portions; and two second peripheral wall portions; and the bag ring comprises: a bottom wall portion configured to hold a peripheral edge portion of the opening of the airbag; a first upright wall having a predetermined first height dimension, that is arranged so as to face the first peripheral wall portion of the retainer; and a second upright wall having a predetermined second height dimension larger than the first height dimension, that is arranged so as to face the second peripheral wall portion of the retainer.

3 Claims, 12 Drawing Sheets

PASSENGER AIRBAG DEVICE

CROSS-REFERENCE TO RELATED APPLICATION

This application claims priority under 35 U.S.C. §119 to Japanese Patent Application No. JP2011-015092 filed on Jan. 27, 2011, the entire content of which is hereby incorporated herein by reference in its entirety.

FIELD OF THE INVENTION

The present invention relates to a passenger airbag device provided in a vehicle such as an automobile or the like.

BACKGROUND OF THE INVENTION

A passenger airbag device which, when an emergency occurs, activates a gas generating device (inflator), inflates an airbag by gas emitted from the gas generating device and restrains the passenger in the passenger seat has been known since the past (for example, refer to JP, A, 2004-001635).

This passenger airbag device comprises a retainer (case) that is fixed to the vehicle body side and retains the inflator on the rear surface side, and a bag protective member that press fits the airbag between itself and the front surface of the retainer, wherein an airbag is folded and housed in the interior of the retainer during normal periods. When an emergency occurs, such as collision or rollover of the automobile, the gas generating device emits the gas, which is then supplied to the interior of the airbag, causing the airbag to inflate and expand due to the pressure thereof.

Further, according to this passenger airbag device, an upright wall of a rectangular shape (substantially square shape from the front view) that surrounds the lateral peripheral surface of the inflator that faces the interior of the airbag is formed on the bag protective member, and is configured to protect the base side of the airbag from the high-temperature, high-pressure gas emitted from the gas emission port formed on the lateral peripheral surface of the inflator.

SUMMARY OF THE INVENTION

In prior art, the upright wall provided to the bag protective member evenly surrounds the lateral peripheral surface of the inflator with its substantially square shape from the front view, making it possible to protect the base side (vehicle body side) of the airbag from the high-temperature, high-pressure environment. Nevertheless, the gas emitted from the gas emission port formed on the lateral peripheral side of the inflator becomes concentrated as though that it was emitted from the insertion end surface of the inflator due to the guide action of the upright wall of the bag protective member. As a result, the possibility exists that the direction of inflation and expansion of the airbag may become concentrated in the direction toward the passenger.

To optimize the passenger airbag device having such a configuration, it is necessary to make the airbag inflate without any extreme concentration of pressure of the gas emitted from the gas generating device while protecting the vehicle body side of the airbag from the high-temperature, high-pressure environment of the gas emitted from the vehicle body side of the airbag to the interior.

It is therefore an object of the present invention to provide a passenger airbag device capable of optimizing the inflation pressure of the airbag while protecting the vehicle body side of the airbag from the high-temperature, high-pressure environment of the gas emitted to the interior of the airbag.

In order to achieve the above-described object, there is provided a passenger airbag device comprising: an airbag that inflates by gas from a gas generating device; a retainer having an opening on a passenger side; a bag ring provided to an inside of the retainer; and the gas generating device that is configured to emit to an interior of the airbag gas from a gas emission port inserted inside the airbag, and provided inside the bag ring; wherein: the retainer further comprises: a base wall that forms a substantially rectangular outer edge shape that is long along a width direction of a vehicle body; two first peripheral wall portions respectively positioned on two short sides of the substantially rectangular shape of the base wall; and two second peripheral wall portions respectively positioned on two long sides of the substantially rectangular shape of the base wall; and the bag ring comprises: a bottom wall portion configured to hold a peripheral edge portion of the opening of the airbag between itself and the base wall of the retainer; a first upright wall having a predetermined first height dimension, that is arranged standing on the bottom wall portion so as to face the first peripheral wall portion of the retainer with a first space therebetween; and a second upright wall having a predetermined second height dimension larger than the first height dimension, that is arranged standing on the bottom wall portion so as to face the second peripheral wall portion of the retainer with a second space smaller than the first space therebetween.

According to the first invention, it is possible to optimize an inflation pressure of an airbag while protecting the vehicle body side of the airbag from the high-temperature, high-pressure environment of the gas emitted to the interior of the airbag.

According to the second invention, in the passenger airbag according to the first invention, the bag ring is configured so that the first upright wall is positioned lower than the gas emission port, and the second upright wall is positioned higher than the gas emission port.

According to the second invention, a second upright wall near a second peripheral wall portion of a retainer highly maintains a protective function that provides protection from the high-temperature, high-pressure environment of the gas, making it possible to highly maintain the emission function of the gas using a first upright wall that is near a first peripheral wall portion and far from a second peripheral wall portion of the retainer.

According to the third invention, in the passenger airbag according to the first invention, corner portions that connect the first upright wall and the second upright wall of the bag ring are formed in a curved shape that protrudes toward an outer diameter side, and are configured so that the second upright wall having the second height dimension and the first upright wall having the first height dimension are connected by a step portion of a smooth, curved shape.

According to the third invention, it is possible to suppress the airbag from catching on a bag ring at the time of inflation.

According to the present invention, it is possible to optimize an inflation pressure of an airbag while protecting the vehicle body side of the airbag from the high-temperature, high-pressure environment of the gas emitted to the interior of the airbag.

BRIEF DESCRIPTION OF THE DRAWINGS

FIG. 1A is a sectional side view of the airbag installed in the vehicle body prior to inflation; and FIG. 1B is a sectional side view of the airbag installed in the vehicle body in an inflated state.

FIG. 9A is a side view of the bag ring in the longitudinal direction; and FIG. 9B is a side view of the bag ring in the transverse direction.

DETAILED DESCRIPTION OF PREFERRED EMBODIMENTS

An embodiment of the present invention will be described below with reference to the attached drawings. In the descriptions below, the vehicle front and rear directions and the vehicle left and right directions are the front and rear directions and left and right directions of the vehicle as seen by a passenger seated in the passenger seat of the vehicle. Also, "front and rear directions," "up and down directions" and "left and right directions" as seen by the passenger seated in the passenger seat of the vehicle are used when indicating directions in space.

Figure 1A:
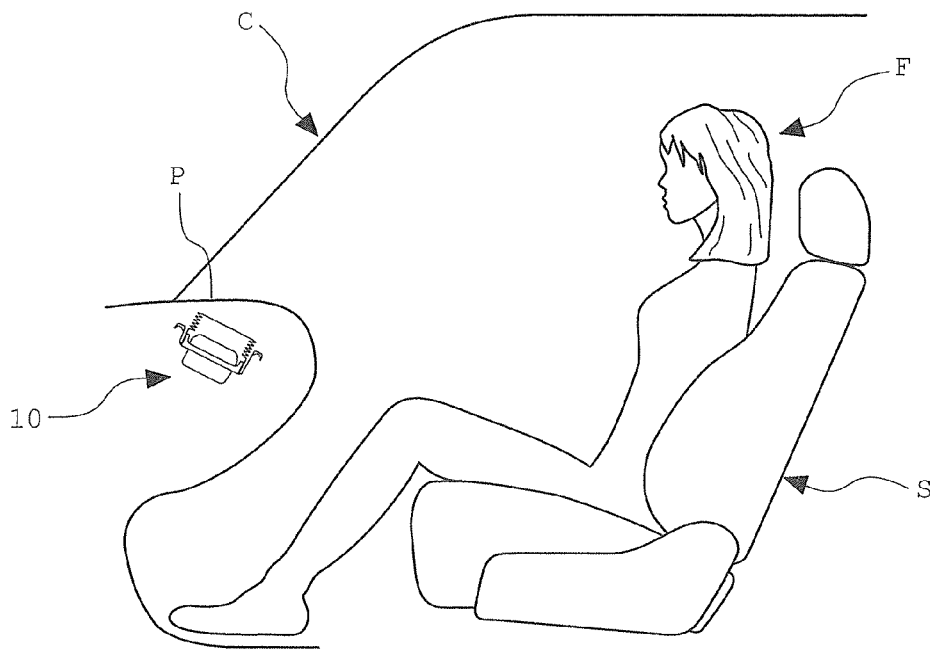
FIGS. 1A and 1B show the general structure of a passenger airbag device according to an embodiment of the present invention.
Figure 1B:
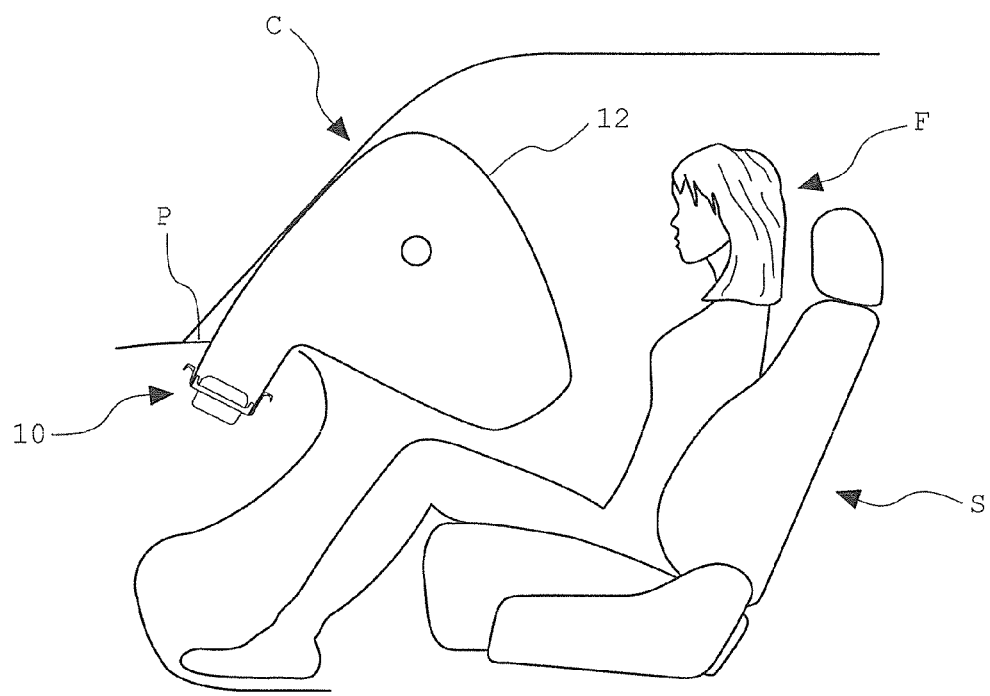
Figure 2:
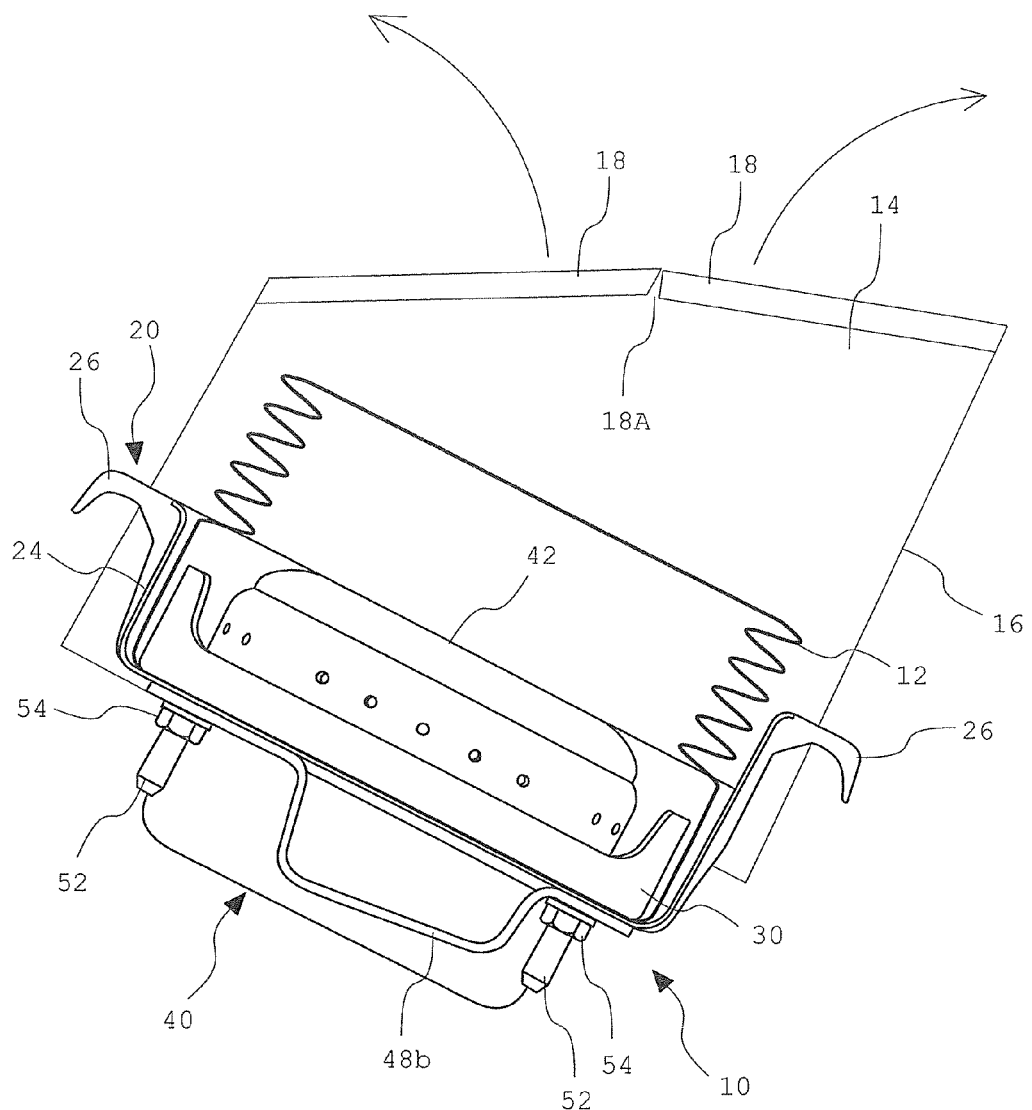
FIG. 2 is a cross-sectional view of the passenger airbag device according to an embodiment of the present invention.
Figure 3:
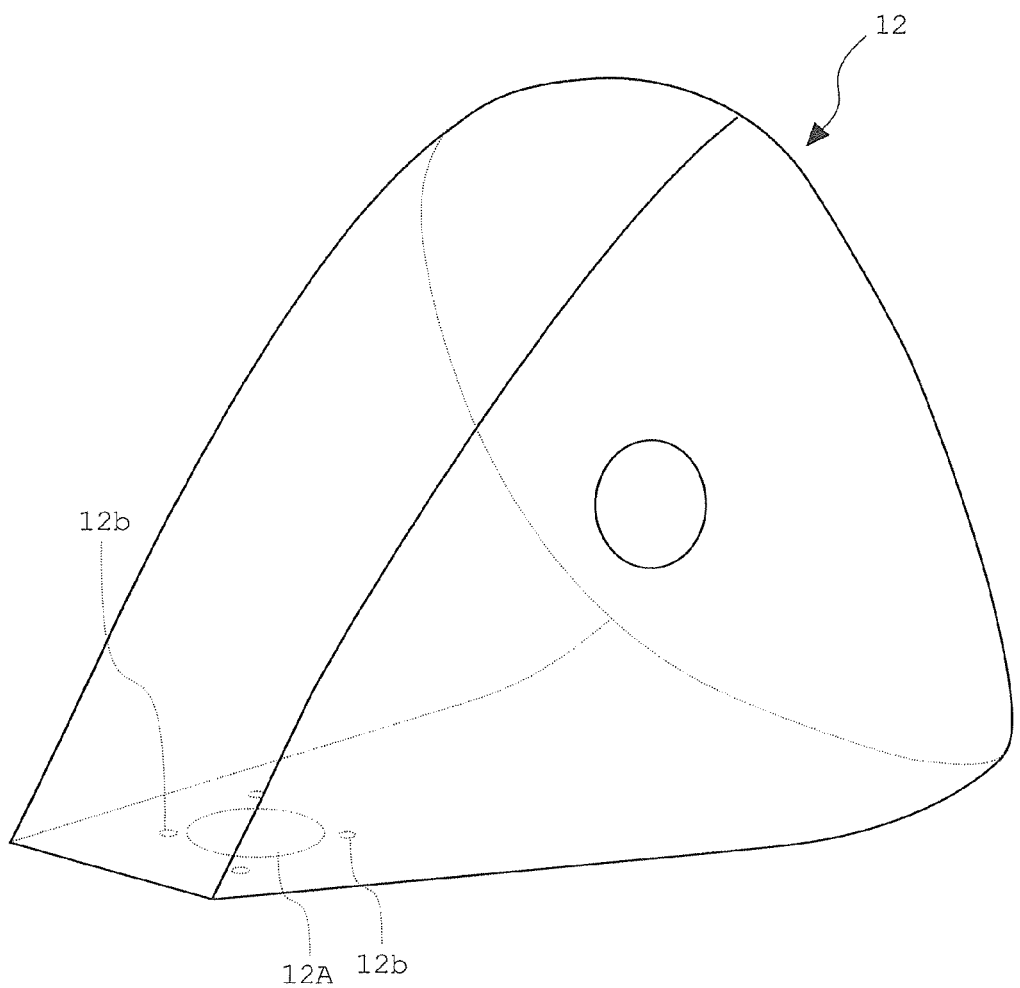
FIG. 3 is a perspective view of the passenger airbag device according to an embodiment of the present invention.

FIG. 1A and FIG. 1B are sectional side views of the passenger airbag device according to the embodiment, installed in the vehicle body before airbag inflation and after airbag inflation, respectively. FIG. 2 is a cross-sectional view of the passenger airbag device, and FIG. 3 is a perspective view of the airbag.

In FIG. 1A and FIG. 1B, an instrument panel P comprising a portion of the inner wall of a vehicle body C is arranged in front of (on the left in FIG. 1) a passenger F seated in a passenger seat S. Further, a passenger airbag device 10 of the embodiment is installed inside the instrument panel P. This passenger airbag device 10, as shown in FIG. 2, comprises an airbag 12, a retainer 20, a bag ring 30, and a substantially disk-shaped inflator 40 (gas generating device). Note that securing members such as brackets for securing the passenger airbag device 10 to the vehicle body (instrument panel P, etc.) are not shown to avoid complexities in illustration.

The airbag 12 is formed into a bag shape by stitching together a plurality of base panels made of polyester, nylon, or the like, for example. Further, the airbag 12 is initially housed within the retainer 20 in a folded state, and inflates by the pressure of gas emitted from the inflator 40 at the time of a vehicular collision, etc. Furthermore, as shown in FIG. 3, a substantially circular introduction opening 12a along with a plurality (four, for example) of bolt through-holes 12b around the periphery thereof are formed on the airbag 12 on the vehicle body side, and a reinforcement base panel (not shown) of the same material is provided around the opening of the introduction opening 12a, which includes the bolt through-holes 12b. Then, the airbag 12 appears inside the vehicle while inflating from an opening 14 provided to the instrument panel P, and inflates and expands between the instrument panel P and the passenger F (refer to FIG. 1B).

Figure 4:
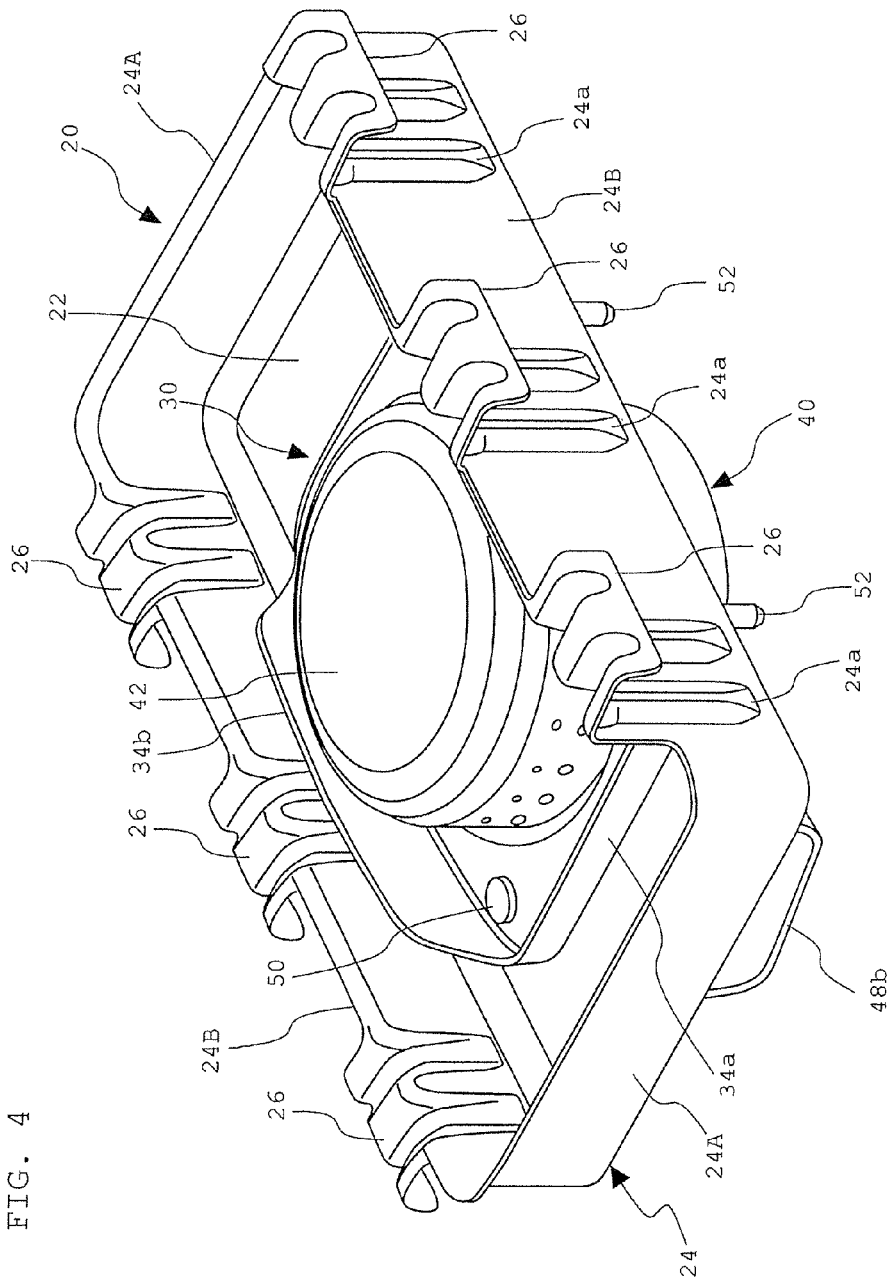
FIG. 4 is a perspective view of the main parts of the passenger airbag device according to an embodiment of the present invention, with the airbag omitted.
Figure 5:
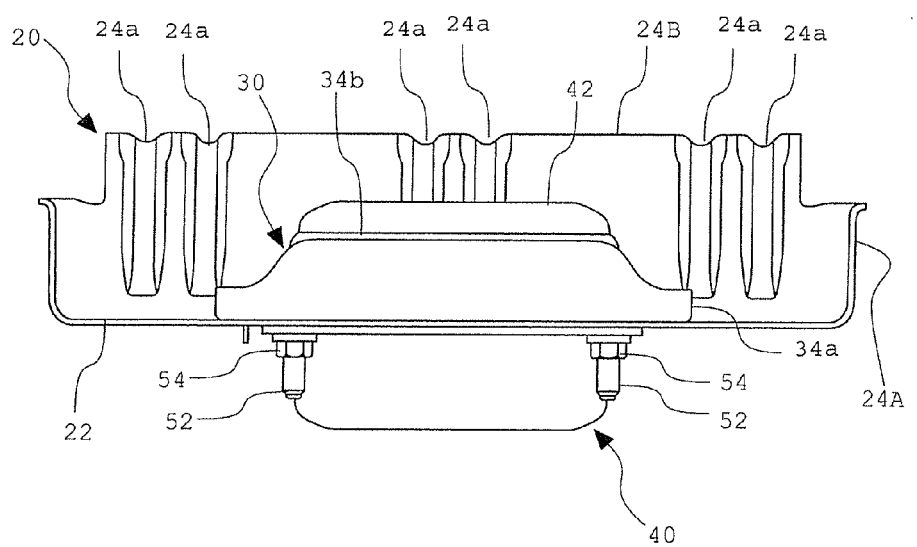
FIG. 5 is a cross-sectional view of the main parts of the passenger airbag device according to an embodiment of the present invention, with the airbag omitted.
Figure 6:
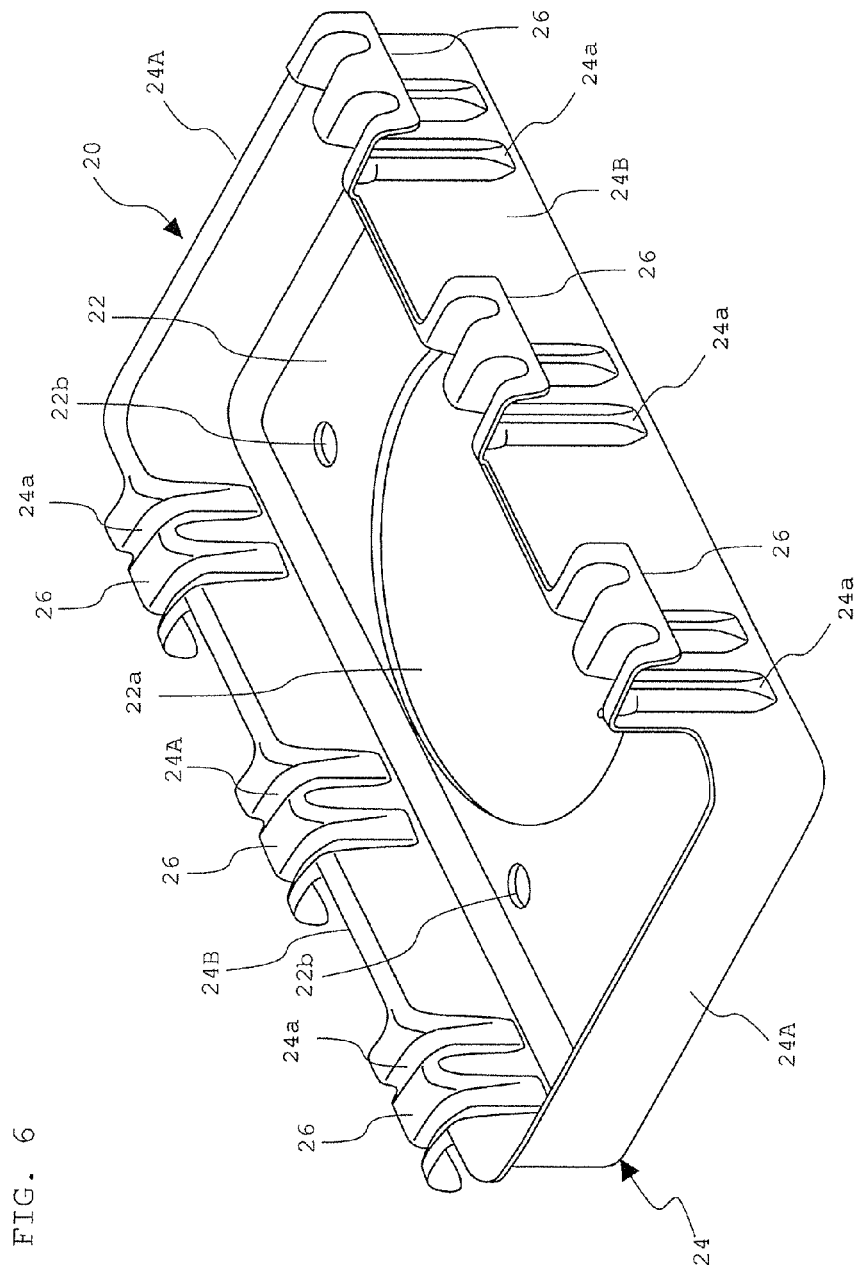
FIG. 6 is a perspective view of the retainer applied to the passenger airbag device according to an embodiment of the present invention.

FIG. 4 is a perspective view of the main parts with the airbag omitted, FIG. 5 is a cross-sectional view of the main parts with the airbag omitted, and FIG. 6 is a perspective view of the retainer. In FIG. 4 to FIG. 6 and the previously described FIG. 2, the retainer 20 integrally comprises a bottom wall 22 (base wall) that forms an oblong, substantially rectangular outer edge shape in the width direction of the vehicle body C, a peripheral wall portion 24 that forms a frame shape that rises from the periphery of the bottom wall 22, and a plurality of hook-shaped hooks 26, forming a housing shape that opens in the direction of inflation of the airbag 12. The peripheral wall portion 24 comprises two first peripheral wall portions 24A and 24A positioned on the short side of the rectangular shape, and two second peripheral wall portions 24B and 24B positioned on the long side of the rectangular shape. Further, an opening 22a is formed at the center of the bottom wall 22 for guiding the inflator 40 into the interior of the airbag 12. Furthermore, a plurality of bolt through-holes 22b is provided around the periphery of the opening 22a on the bottom wall 22.

The hooks 26 are provided in both the vehicle front and rear directions of the main body portion 22 with the retainer 20 installed to the vehicle [the instrument panel P and the cross-member (not shown), for example]. Further, the hooks 26 are passed through hook holes (not shown) provided to a frame-shaped support member 16 fixed to the instrument panel P and locked, hooking the retainer 20 to the support member 16 (refer to FIG. 2).

This support member 16 partially makes up the instrument panel P, with the upper end portion thereof installed to the outer peripheral portion of a lid 18 breakable for the purpose of the inflation of the airbag 12. Further, the support member 16 is arranged so as to cover the sides of the airbag 12 in the folded state. Furthermore, the opening 14 which also serves as the opening end of the support member 16 is blocked by the lid 18 under normal conditions (the state shown in FIG. 2). Then, when the inflator 40 is activated, the lid 18 moves rotationally (refer to the arrow in FIG. 2) while breaking along a rupturable tear line 18a formed on the lid 18, opening the opening 14 as the airbag 12 simultaneously inflates and appears toward the passenger F side.

Further, the hooks 26 are integrally provided from the opening edge portion of the second peripheral wall portions 24B toward the lateral exterior. Further, a rib 24a for strength reinforcement having a concave outer peripheral side and a convex inner peripheral side is provided to each of these hooks 26, along the direction in which the hooks 26 protrude. Furthermore, the rib 24a is formed so that it extends from the hook 26 to the second peripheral wall portion 24B, with the inside and the outside of the second peripheral wall portion 24B having concave and convex shapes, respectively. Further, the first peripheral wall portions 24A and the second peripheral wall portions 24B are made to have the same height dimension across the entire periphery thereof. Note that the opening edge portion of the peripheral wall portion 24 curves in a gradual curved shape toward the outside.

The bag ring 30 is formed by pressing a sheet of steel, such as cold-rolled steel or hot-rolled steel, for example, and is configured to press and hold the peripheral edge portion of the introduction opening 12a of the airbag 12 between itself and the retainer 20. The steel sheet that serves as the material for the bag ring 30 is not a highly elastic material such as a spring material, but rather a general steel sheet that has lower elasticity than a spring material.

Figure 7:
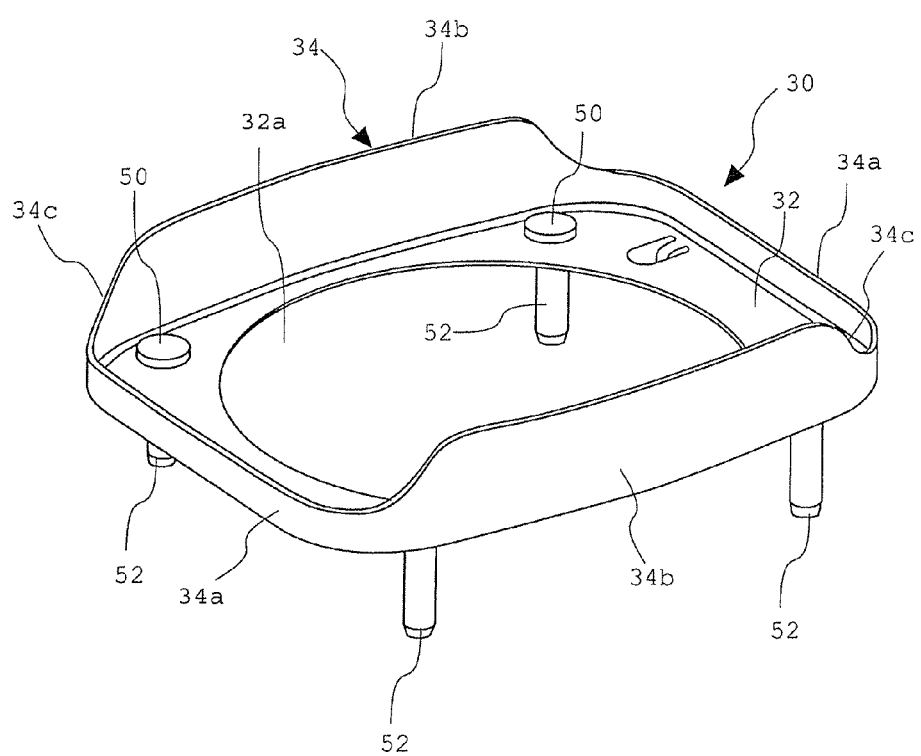
FIG. 7 is a perspective view of the bag ring applied to the passenger airbag device according to an embodiment of the present invention.
Figure 8:
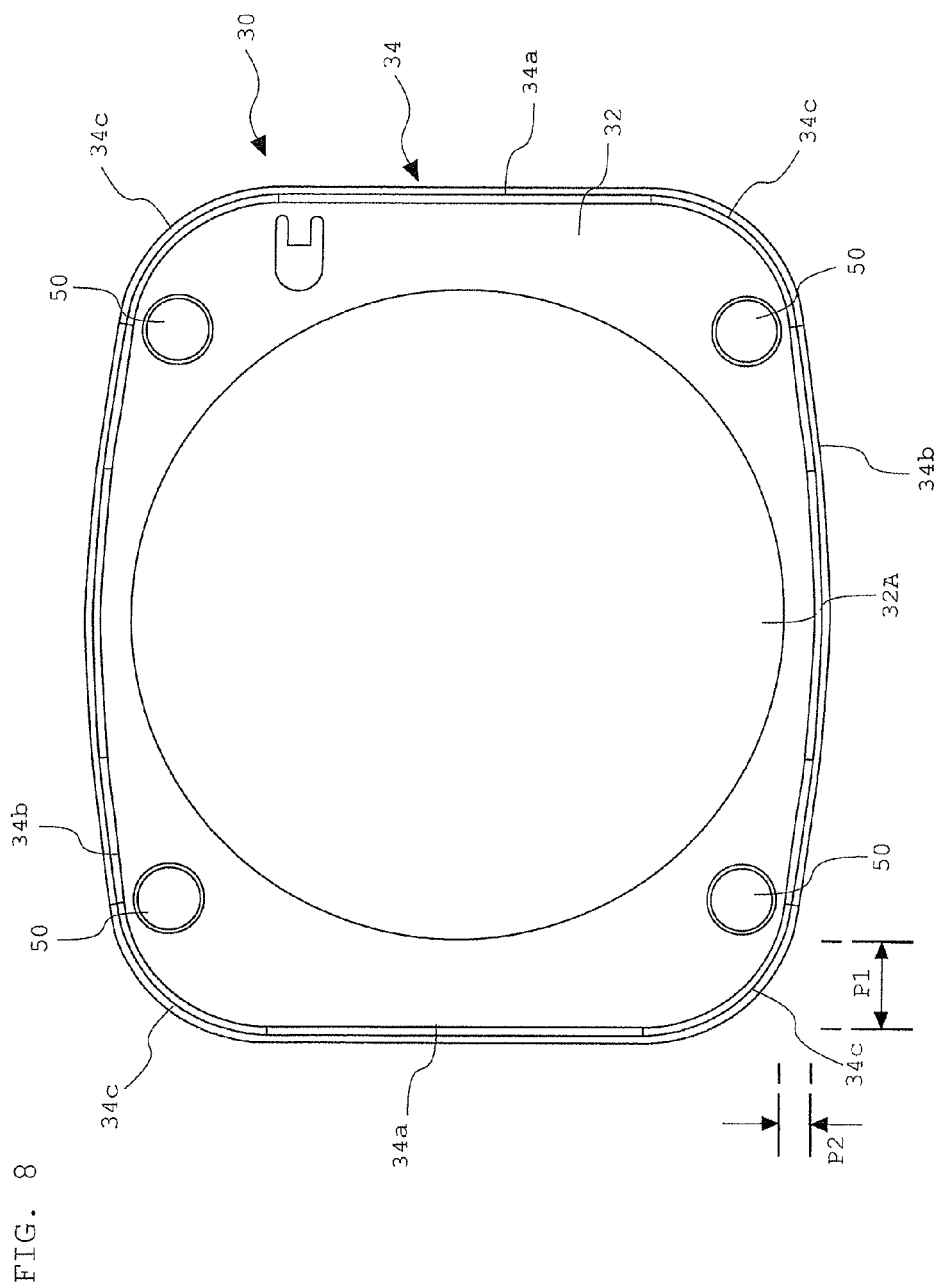
FIG. 8 is a front view of the bag ring applied to the passenger airbag device according to an embodiment of the present invention.
Figure 9A:
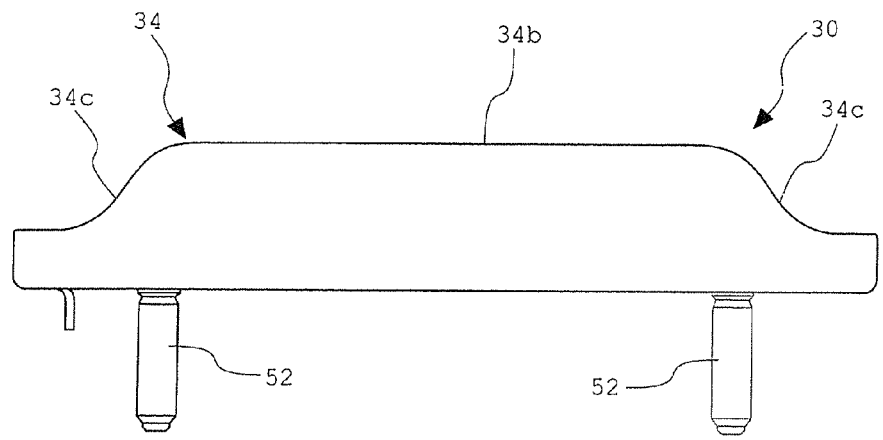
FIGS. 9A and 9B show the bag ring applied to the passenger airbag device according to an embodiment of the present invention.
Figure 9B:
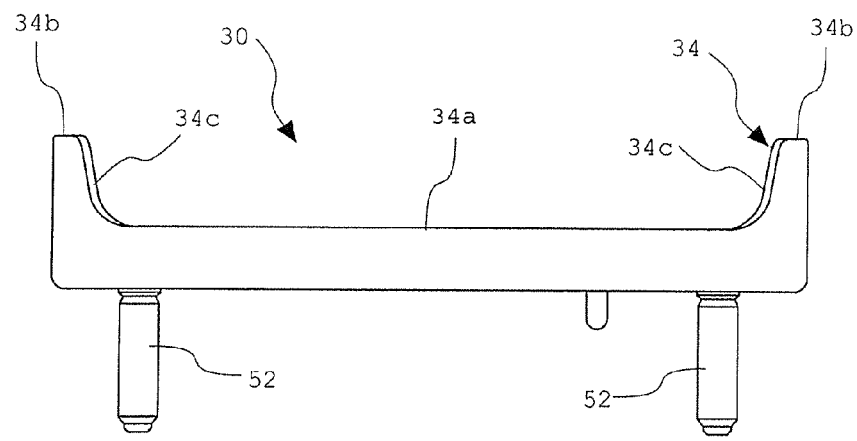

FIG. 7 is a perspective view of the bag ring, FIG. 8 is a front view of the bag ring, FIG. 9A is a side view of the bag ring in the longitudinal direction, and FIG. 9B is a side view of the bag ring in the transverse direction. The bag ring 30, as shown in FIG. 7 to FIG. 9, integrally comprises a bottom wall portion 32 that is somewhat oblong bottom in the width direction of the vehicle body C, and an upright wall 34 of a frame shape that rises from the periphery of the bottom wall portion 32, and is configured to open in the direction of inflation of the airbag 12. Further, an opening 32a for guiding the inflator 40 into the interior of the airbag 12 is formed at the center of the bottom wall portion 32. Furthermore, a plurality of bolts 50 is provided around the periphery of the opening 32a on the bottom wall portion 32.

The upright wall 34 is disposed so that it opens in the direction of inflation of the airbag 12, facing the peripheral wall portion 24 with a predetermined amount of space therebetween. At this time, within the upright wall 34, first upright walls 34a and 34a respectively facing the first peripheral wall portions 24A and 24A are positioned away from the first peripheral wall portions 24A, and second upright walls 34b and 34b facing the second peripheral wall portions 24B and 24B are positioned near the second peripheral wall portions 24B, since the retainer 20 is oblong in the width direction of the vehicle body C. Further, the upright wall 34 is formed so that the height dimension (second height dimension) of the second upright walls 34b facing both end sides in the transverse direction is larger than the height dimension (first height dimension) of the first upright walls 34a facing the first peripheral wall portions 24A. At this time, the first upright walls 34a facing the first peripheral wall portions 24A are set lower than a gas emission port 46 of the inflator 40 described later, and the second upright walls 34b facing the second peripheral wall portions 24B are set higher than the gas emission port 46. Furthermore, the corner portions of the upright wall 34, that is, the four corners which serve as connecting portions of the first upright walls 34a and the second upright walls 34b are formed in a curved shape that protrudes toward the outside (refer to FIG. 8), and the first upright walls 34a and the second upright walls 34b are connected by a step portion 34c of a smooth, curved shape.

The inflator 40 is fixed to the rear surface side of the bottom wall 22 so that an end surface 42 of the gas emission end side protrudes from the opening 22a formed on the bottom wall 22 of the main body portion 22, and supplies gas to the interior of the airbag 12. Thus, the inflator 40 serves as gas generating device that receives an electrical signal from an airbag control unit (not shown) at the time of a vehicular collision, etc., and generates gas. Further, the inflator 40 comprises a gas generating agent that generates gas when combusted, and an igniter, etc. that receives an electrical signal to ignite the gas generating agent.

Figure 10:
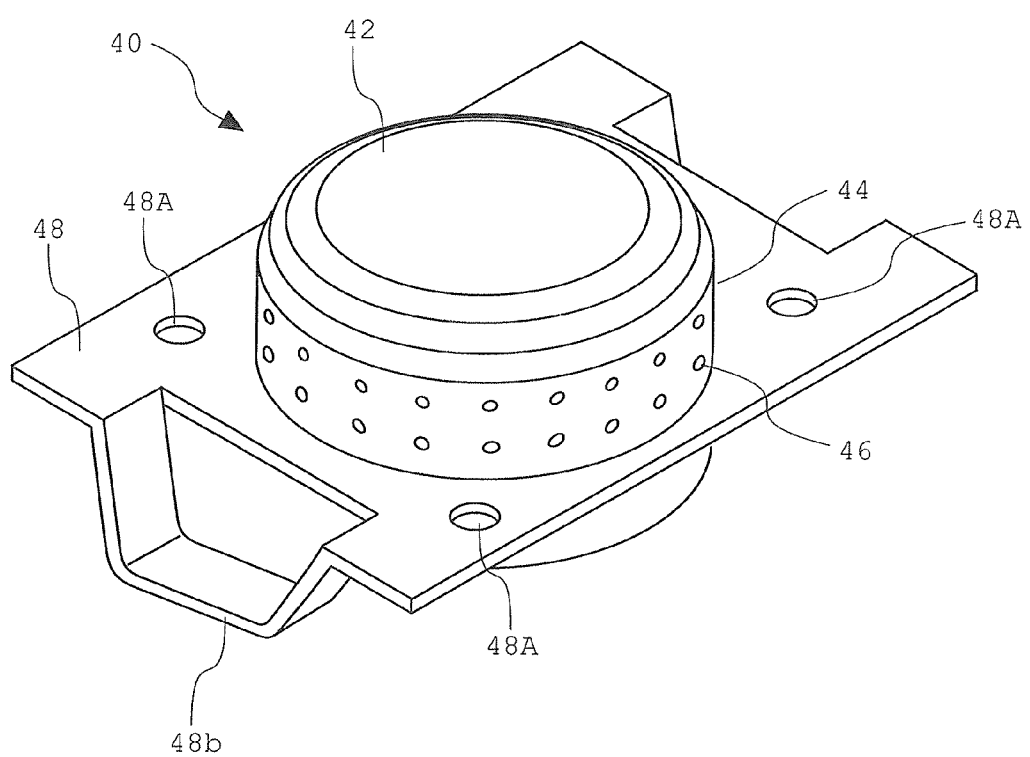
FIG. 10 is a perspective view showing the detailed structure of the inflator.

FIG. 10 is a perspective view showing the detailed structure of the inflator. The inflator 40 used, as shown in FIG. 10 and FIG. 4 to FIG. 6, etc., is a so-called disk type in which the outer shape is formed into a thick disk shape, and the plurality of gas emission ports 46 are provided spaced apart in the peripheral direction on a lateral peripheral surface 44 positioned on the front side of the retainer 20 with the end surface 42 of the gas emission end side protruding from the opening 22a.

The inflator 40 is inserted so that it passes through the opening 22a of the retainer 20, the introduction opening 12a of the airbag 12, and the opening 32a of the bag ring 30, with the direction of the center axis substantially matching the direction of the normal vector of the retainer 20, and the end surface 42 of the gas emission end side is positioned inside the airbag 12. With this arrangement, the gas emission port 46 is formed on the lateral peripheral surface 44 of the portion in which the end surface 42 of the gas emission end side of the inflator 40 is inserted into the airbag 12. Furthermore, the inflator 40 comprises a flange 48 that overhangs in a flange shape from the lateral peripheral surface 44. A bolt through-hole 48a and a curved portion 48b for reinforcement are formed on this flange 48.

The bolt 50 is fixed by welding, etc., to the bag ring 30 with a thread portion 52 protruding on the rear side of the bag ring 30 and, once tightened with a nut 54 onto the thread portion 52 after being passed through the bolt through-hole 12b of the airbag 12, the bolt through-hole 22b of the retainer 20, and the bolt through-hole 48a of the inflator 40, connects the airbag 12, the retainer 20, the bag ring 30, and the inflator 40.

As described above, the passenger airbag device 10 is fixed to the support member 16 and the vehicle body with the airbag 12, the retainer 20, the bag ring 30, and the inflator 40 connected by the tightening of the bolts 50 and the nut 54.

In the passenger airbag device 10 configured as described above, normally, the airbag 12 is stored folded inside the retainer 20, as shown in FIG. 1A. When an emergency occurs, such as collision of the vehicle, the inflator 40 operates by a control signal being input from a control device (not illustrated). As a result, a gas generating agent inside is ignited and gas is emitted, and as a result, internal pressure rises, and the airbag 12 that was in the folded state begins to inflate and expand. As shown in FIG. 1B, by the force of its expansion, the airbag 12 breaks the tear line 18a and causes the lid 18 to open, and expands to the outside of the retainer 20 and instrument panel P, inflating and expanding toward the passenger F seated in the passenger seat S. As a result, the inflated and expanded airbag 12 restrains the upper half of the body of the passenger F.

Figure 11:
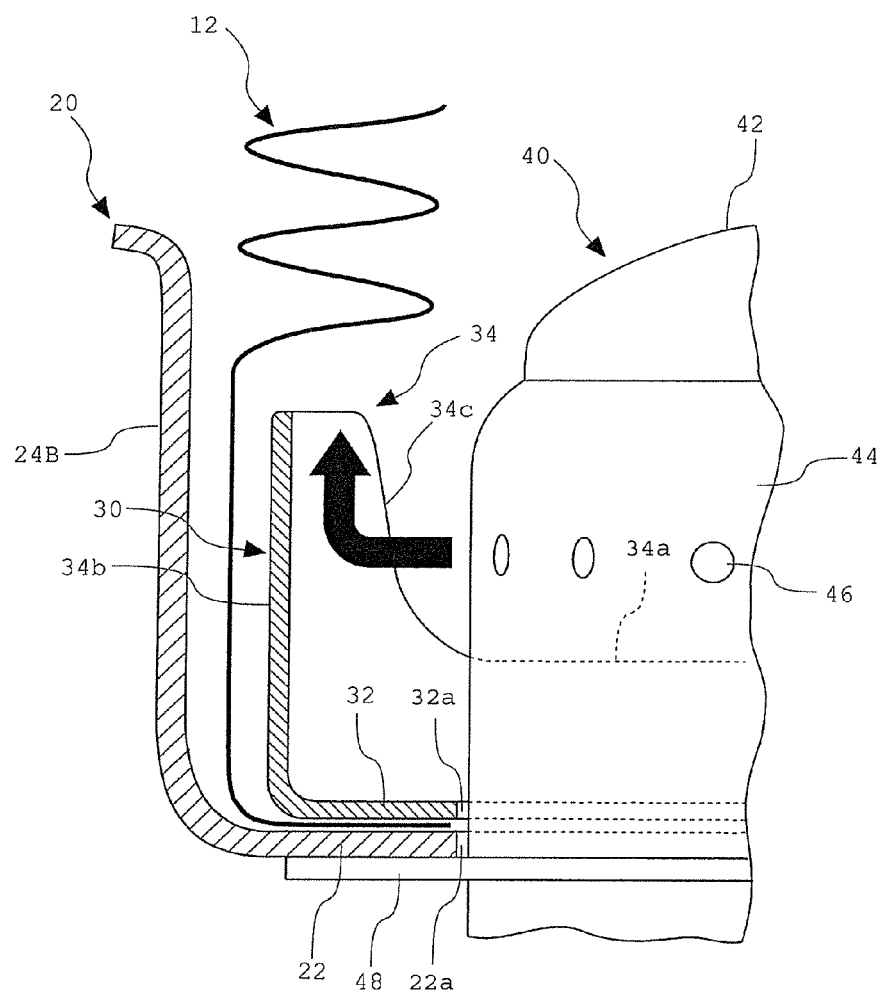
FIG. 11 is an enlarged cross-sectional view of the main parts in the retainer transverse direction.
Figure 12:
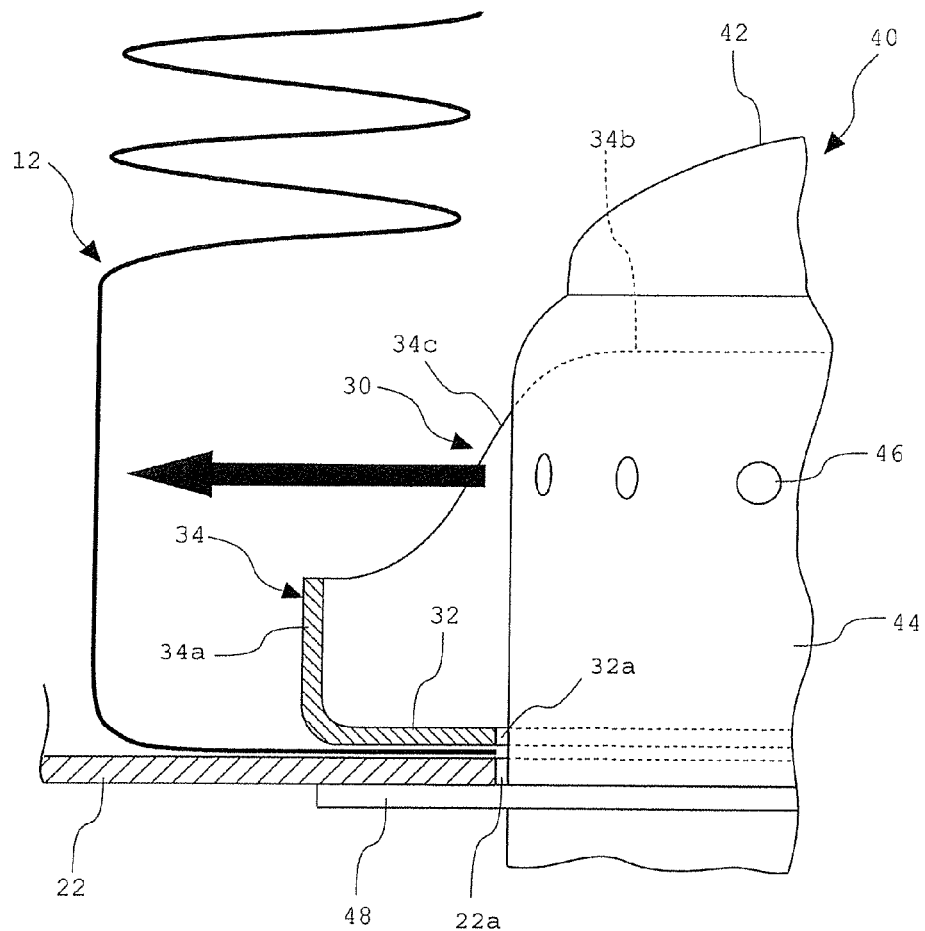
FIG. 12 is an enlarged cross-sectional view of the main parts in the retainer longitudinal direction.

Here, as described above, the first upright wall 34a positioned away from both the peripheral wall portion 24 and the lateral peripheral surface 44 (see space P1 in FIG. 8) is set lower than the gas emission port 46, and the second upright wall 34b positioned near both the peripheral wall portion 24 and the lateral peripheral surface 44 (see space P2 in FIG. 8) is set higher than the gas emission port 46. With this arrangement, as shown in FIG. 11 which is an enlarged cross-sectional view of the main parts of the retainer in the transverse direction, the vehicle body side of the airbag 12 near the gas emission port 46 is protected from the high-temperature, high-pressure environment of the gas by the second upright wall 34b (see the bold arrow in FIG. 11). On the other hand, as shown in FIG. 12 which is an enlarged cross-sectional view of the main parts of the retainer in the longitudinal direction, the vehicle body side of the airbag 12 away from the gas emission port 46 promotes inflation in the width direction of the vehicle body C by the pressure of the gas that passes over the first upright wall 34a (see the bold arrow in FIG. 12). That is, it is possible to optimize an inflation pressure of the airbag 12 while protecting the vehicle body side of the airbag 12 from the high-temperature, high-pressure environment of the gas emitted to the interior of the airbag 12.

Further, in particular, according to the embodiment, within the upright wall 34 of the bag ring 30, the first upright wall 34a facing the first peripheral wall portion 24A is lower than the gas emission port 46, and the second upright wall 34b facing the second peripheral wall portion 24B is higher than the gas emission port 46, making it possible to highly maintain the protective function that provides protection from the high-temperature, high-pressure environment of the gas by the second upright wall 34b near the second peripheral wall portion 24B of the retainer 20, and highly maintain the emission function that emits gas by the first upright wall 34a near the first peripheral wall portion 24A and away from the second peripheral wall portion 24B.

Further, in particular, according to the embodiment, the four corners of the bag ring 30 are formed in a curved shape protruding toward the outside, and the first upright wall 34a and the second upright wall 34b are connected by the step portion 34c having a smooth, curved shape. With this arrangement, it is possible to suppress the airbag 12 from catching on the bag ring 30 at the time of inflation.

Although other examples are not individually described herein, various changes and modifications can be made without departing from the spirit and scope of the present invention.

What is claimed is:

1. A passenger airbag device comprising:
    an airbag that inflates by gas from a single gas generating device;
    a retainer having an opening on a passenger side;
    an upwardly open bag ring mounted to said retainer; and
    said single gas generating device having a disk-like shape being configured to emit gas to an interior of said airbag from a plurality of gas emission ports inserted inside said airbag, and mounted to said bag ring; wherein:
    said retainer further comprises:
    a base wall that forms a substantially rectangular outer edge shape that is long along a width direction of a vehicle body;
    two first peripheral wall portions respectively positioned on two short sides of said substantially rectangular shape of said base wall; and
    two second peripheral wall portions respectively positioned on two long sides of said substantially rectangular shape of said base wall; and
    said bag ring comprises:
    a bottom wall portion configured to hold a peripheral edge portion of the airbag extending about an opening thereof between the bottom wall portion and said base wall of said retainer;
    a first upright wall having a predetermined first height dimension, that extends upwardly from said bottom wall portion to an upper edge thereof so as to face said first peripheral wall portion of said retainer with a first space therebetween with the predetermined first height dimension being sized from the bottom wall portion to the first upright wall upper edge so that multiple ones of the gas emission ports adjacent thereto are disposed above the first upright wall upper edge, said first upright wall extending in a generally transverse direction to the width direction to extend along the single gas generating device for substantially the entire extent thereof in the transverse direction;
    a second upright wall having a predetermined second height dimension larger than said first height dimension, that extends upwardly from said bottom wall portion to an upper edge thereof so as to face said second peripheral wall portion of said retainer with a second space smaller than said first space therebetween with the predetermined second height dimension being sized from the bottom wall portion to the second upright wall upper edge to be higher than the gas emission ports adjacent thereto, said second upright wall being longer than the first upright wall to extend along the single gas generating device for substantially the entire extent thereof in the width direction; and
    an upper opening of the bag ring having the upper edges of the first and second upright walls extending thereabout so that gas emitted from the gas emission ports adjacent to the second upright wall is redirected upwardly through the upper opening for inflating and expanding the airbag in an upward direction, wherein
    the gas generating device has:
    an axis extending along a vertical up-down direction; and
    the plurality of gas emission ports include a plurality of first gas emission ports at an axial upper portion thereof and a plurality of second gas emission ports at an axial lower portion thereof the first and second gas emission ports being respectively arranged at equal intervals along a circumferential direction of the gas generating device,
    the first upright wall being arranged so that the plurality of second gas emission ports are obstructed by the first upright wall, when viewed from the side of the first peripheral wall portion, and
    the second upright wall being arranged so that the plurality of second gas emission ports are obstructed by the second upright wall and the plurality of first gas emission ports are obstructed by the second upright wall, when viewed from the side of the second peripheral wall portion.

2. The passenger airbag device according to claim 1, wherein:
    the first and second upright walls generally extend linearly in the transverse and width directions, respectively, and
    corner portions connect said first upright wall and said second upright wall of said bag ring, the corner portions having an outwardly protruding curved shape so that said second upright wall having said second height dimension and said first upright wall having said first height dimension are connected by a step portion of a smooth, curved shape.

3. The passenger airbag device according to claim 1 wherein the bottom wall portion has an opening in which the gas generating device is received, the first upright wall has a first predetermined minimum space from the bottom wall portion opening, and the second upright wall has a second predetermined minimum space from the bottom wall portion opening with the first predetermined minimum space being approximately three times greater than the second predetermined minimum space.

* * * * *